Jan. 10, 1933.  W. F. PAPE  1,894,223
SPREADER
Filed April 26, 1930
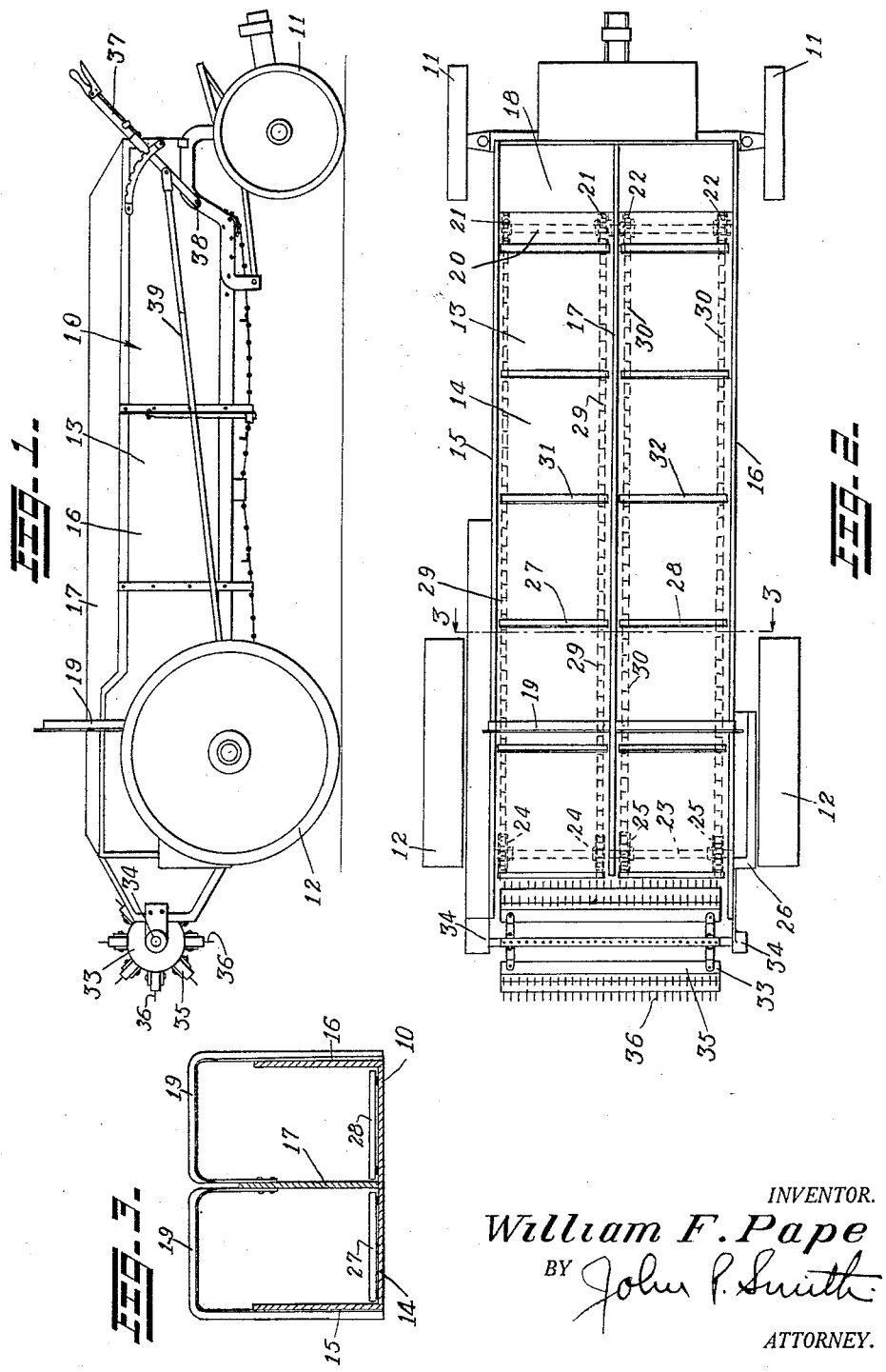
INVENTOR.
*William F. Pape*
BY *John P. Smith*
ATTORNEY.

UNITED STATES PATENT OFFICE

WILLIAM F. PAPE, OF CHICAGO, ILLINOIS

SPREADER

Application filed April 26, 1930. Serial No. 447,491.

The present invention is directed generally to a manure spreader.

One of the objects of the present invention is to provide a novel and improved construction of a spreader in which a division wall is positioned longitudinally in the center of the spreader box, dividing the box into two compartments in which separate conveyors are provided in each compartment for separately conveying the material to the distributing mechanism of the rear of the spreader.

Another object of the invention is to provide an improved spreader construction in which the spreader box is divided into two longitudinally extending compartments by a division wall and arranging a separate conveyor in each of the compartments, through which arrangement one conveyor may be driven at a relatively faster speed than the other if necessary, or both may be driven at the same rate of speed. In this connection, manure may be placed on one side of the division wall or in one compartment, while lime or crushed rock may be positioned in the other compartment in which both materials may be distributed by this spreader in one operation.

These and other objects are accomplished by providing a construction and an arrangement of the various parts in the manner hereinafter described and particularly pointed out in the appended claims.

Referring to the drawing:

Fig. 1 is a side elevational view of a conventional form of a manure spreader, showing my improvement embodied therein;

Fig. 2 is a top plan view of the same; and

Fig. 3 is a cross-sectional view taken on the line 3—3 in Fig. 2.

In manure spreaders of the type heretofore manufactured and sold considerable difficulty has been experienced in connection with the type of spreader provided with the fixed bottom and movable conveyor slats or with the type with the movable bottom. In this type of a spreader, the manure is generally piled or heaped in the longitudinal center of the box and in some cases extends a considerable distance above the side of the spreader box. Under such conditions a greater amount of manure is discharged onto the distributing mechanism at the center point, making it almost impossible to secure proper distribution of the manure and in many such instances the manure is discharged in large lumps. Then, too, this tremendous weight in the center of the spreader box causes the slats, which have their outer ends fastened to each of the endless chains, to bend in the center, in which case, the distance between the two chains becomes shortened so that they will not run over the sprockets located on each end of the spreader box, rendering the spreader inoperative.

It is therefore one of the primary objects of the present invention to overcome these difficulties by dividing the spreader box into two longitudinally extending compartments by positioning a dividing wall in the longitudinal center of the box and arranging two separate conveying means within each compartment so that as the manure is loaded on the box the same will be equally distributed in each compartment and more evenly conveyed to the distributing mechanism on the rear of the spreader.

In illustrating one form of my invention, I have shown the same in connection with a conventional form of manure spreader generally indicated by the reference character 10. The spreader in this case is provided with the usual front steering wheels 11 and rear traction wheels 12, which in turn support in any well-known manner the spreader box generally indicated by reference character 13, which comprises a fixed bottom 14 and sides 15 and 16. Extending longitudinally of the box 13 and located in the center thereof, is a division wall 17 which is secured to the bottom 14, and to an inclined forward end 18 of the manure spreader box in any well known manner. The rear end of the division wall 17 is preferably supported by arched angle irons which are secured on their outer ends to the outside of the side box frame members 15 and 16 and have their inner ends connected to the opposite sides of the division wall 17. Mounted in suitable bearings in the forward end of the manure spreader frame is a transverse shaft 20. Journaled on the shaft 20 are two pairs of sprockets 21 and 22 respectively which form the idle sprockets for the separate conveying mechanisms hereinafter described. Mounted in suitable bearings in the rear end of the spreader frame is a drive shaft 23. Secured to the drive shaft 23 are two pairs of sprockets 24 and 25. The shaft 23 is driven by a ratchet mechanism of the construction well understood in the art and only diagrammatically shown at 26, which in turn is operatively driven by one of the traction wheels 12 in a manner well understood in the art. Trained about each pair of idle sprockets 21 and 22 and driving sprockets 24 and 25 respectively, are two sets of conveying mechanisms generally indicated by the reference characters 27 and 28. Each of these conveying mechanisms comprise conveyor chains 29 and 30 which in turn are provided with suitable spaced-apart cleats 31 and 32.

While in the above description I have described a fixed bottom type of spreader and two endless conveyors with spaced apart cleats, it will of course be understood that movable bottom type of conveyors may be mounted in each of these compartments which is commonly used in the conventional form of a manure spreader and I therefore do not want to restrict my invention to the type of conveyor shown in the drawing.

Under certain conditions it may be desirable to feed the material in one compartment faster rearwardly than the material in the other compartment. Such for example, as lime or crushed stone in one compartment and manure in the other compartment. If the operator finds it desirable to feed lime and manure at the same time, these may be fed simultaneously for equal distribution or if it is found desirable to feed one of the materials in one compartment faster than the material in the other compartment, larger sprocket wheels may be substituted for the sprocket wheels 25 in which the conveyor 32 will be fed rearwardly more rapidly than the conveyor 31, resulting in a greater distribution of the material on the conveyor 32 than on the conveyor 31.

Mounted adjacent the rear end of the conveyor, is a distributing cylinder generally indicated by the reference character 33. This distributing cylinder 33 is mounted in suitable bearings 34 located on the opposite sides of the spreader. This distributing cylinder is operatively driven through a chain operatively connected with the drive sprocket on the traction wheels 12 in a manner well understood in the art. The distributing cylinder illustrated in the drawing comprises a plurality of cylindrically arranged bars 34 having radially extending teeth 36 for distributing the material that is conveyed toward it by the two conveyors 31 and 32.

The manure spreader illustrated in the drawing is provided with a suitable lever 37 which is pivoted at 38 and connected to a connecting rod 39 for controlling the operation of the ratchet mechanism for driving the conveyors.

From the above description it will be obvious to one versed in the art, that by providing a partition wall extending longitudinally of the box of the spreader so it divides the same in two longitudinally extending compartments and providing separate and independent conveying mechanisms for each of the compartments, that the material being loaded into the box of the manure spreader will be more evenly and uniformly distributed over the two conveyors, and as the result thereof, the material will be more uniformly fed to the distributing mechanism on the rear of the spreader. It will also be noted that by providing two compartments into which different types of material, such as crushed rock, lime and manure may be distributed simultaneously and in proportion to the desires or wishes of the operator.

While in the above specification I have described one embodiment which my invention may assume in practice, it will of course, be understood that the same is capable of modification, and that modification may be made without departing from the spirit and scope of the invention as expressed in the following claims:

What I claim as my invention and desire to secure by Letters Patent is:

1. The combination with a manure spreader, of a material carrying box mounted thereon, a high division wall mounted in the longitudinal center of said box, for dividing said box into two longitudinally extending compartments and dividing the manure into two separate piles, a drive shaft mounted on said spreader at the rear end thereof, driving sprockets mounted on said shaft and located in each of said compartments, and endless conveyors mounted in each compartment and driven by said sprockets for conveying the material rearwardly in said box.

2. The combination with a manure spreader, of a longitudinally extending box mounted thereon, said box having a fixed bottom and vertically extending side walls, a division wall extending substantially the height of said side walls secured to said bottom and located in the longitudinal center of said box for dividing said box into two longitudinally extending compartments, conveying mechanisms individual to each compartment and a single drive shaft for driving each of said conveying mechanisms for conveying the material rearwardly in each compartment.

3. The combination with a manure spreader, of a rectangular box mounted thereon and having a fixed bottom and two vertically extending walls on the opposite sides thereof, a division wall mounted in the longitudinal center of said box and extending above the side walls thereof for dividing said box into two longitudinally extending compartments, endless conveyors mounted in each compartment, a shaft mounted in the rear end of said spreader, and sprockets secured to said shaft and engageable with said conveyors for driving the same.

4. The combination with a manure spreader, of a box mounted thereon, a division wall mounted in the longitudinal center of said box for dividing said box into two compartments, said division wall being secured to the bottom of said box, two arched members secured to the rear end of said spreader box for securely supporting the division wall in the center thereof, a distributing mechanism located at the rear end of said box and conveyors mounted in each of said compartments for conveying the material rearwardly to said distributing mechanism.

5. The combination with a manure spreader, of a box mounted thereon having a relatively fixed bottom and two side walls, a longitudinally extending division wall mounted in the center of said box and secured to the bottom thereof, arched members secured to the side walls of said box and said division wall, a shaft mounted in the forward end of said spreader having idle sprockets mounted thereon, a drive shaft mounted at the rear end of said spreader having driving sprockets mounted thereon, a distributing mechanism located at the rear end of said box and conveyors individual to each of the compartments trained on said idle sprockets and said driving sprockets for conveying the material in each compartment rearwardly to said distributing mechanism.

6. The combination with a manure spreader, of a box mounted thereon, a longitudinally extending division wall extending above said box mounted in the center of said box for dividing said box into two longitudinally extending compartments, a revolving distributing mechanism mounted on the rear of said spreader and conveying mechanism mounted in each of said compartments including two pairs of endless chains and transverse slats for conveying the material rearwardly to said spreading mechanism.

In testimony whereof I have signed my name to this specification, on this 22nd day of April, A. D. 1930.

WILLIAM F. PAPE.